(12) United States Patent
Chae et al.

(10) Patent No.: US 9,887,823 B2
(45) Date of Patent: Feb. 6, 2018

(54) METHOD AND DEVICE FOR TRANSMITTING RECEPTION CONFIRMATION RESPONSE IN WIRELESS COMMUNICATION SYSTEM

(71) Applicant: LG Electronics Inc., Seoul (KR)

(72) Inventors: Hyukjin Chae, Seoul (KR); Hakseong Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 14/783,889

(22) PCT Filed: May 7, 2014

(86) PCT No.: PCT/KR2014/004005
§ 371 (c)(1),
(2) Date: Oct. 12, 2015

(87) PCT Pub. No.: WO2014/182039
PCT Pub. Date: Nov. 13, 2014

(65) Prior Publication Data
US 2016/0056940 A1    Feb. 25, 2016

Related U.S. Application Data

(60) Provisional application No. 61/819,667, filed on May 6, 2013.

(51) Int. Cl.
*H04L 5/00* (2006.01)
*H04L 1/18* (2006.01)
*H04L 12/18* (2006.01)

(52) U.S. Cl.
CPC .......... *H04L 5/0055* (2013.01); *H04L 1/1861* (2013.01); *H04L 12/18* (2013.01)

(58) Field of Classification Search
CPC ................................ H04L 5/0055
See application file for complete search history.

(56) References Cited

U.S. PATENT DOCUMENTS

2006/0291410 A1* 12/2006 Herrmann .......... H04W 4/06
  370/328
2008/0212582 A1*  9/2008 Zwart .............. H04L 1/1692
  370/390

(Continued)

FOREIGN PATENT DOCUMENTS

KR   1020050098131   10/2005
KR   1020100038440    4/2010

(Continued)

*Primary Examiner* — Brian D Nguyen
*Assistant Examiner* — Toan Nguyen
(74) *Attorney, Agent, or Firm* — Dentons US LLP

(57) ABSTRACT

One embodiment of the present invention relates to a method for transmitting and receiving signals between devices in a wireless communication system, the signal transmission and reception method comprising the steps of: receiving, by a first device, a signal from a second device; and transmitting, by the first device, a reception confirmation response to the signal, wherein a resource region in which the reception confirmation response is transmitted is differentiated according to whether the reception confirmation response is ACKnowledgement (ACK) or Negative ACKnowledgement (NACK), and the resource region in which the reception confirmation response is transmitted is commonly used for devices which have received the signal.

6 Claims, 12 Drawing Sheets

(a)

(b)

(56) References Cited

U.S. PATENT DOCUMENTS

| | | | | |
|---|---|---|---|---|
| 2009/0016311 | A1* | 1/2009 | Wu | H04W 8/186 370/342 |
| 2010/0246561 | A1* | 9/2010 | Shin | H04W 52/32 370/345 |
| 2012/0083283 | A1 | 4/2012 | Phan et al. | |
| 2013/0198470 | A1* | 8/2013 | Horiguchi | G11C 16/26 711/162 |

FOREIGN PATENT DOCUMENTS

| | | |
|---|---|---|
| WO | 2012071736 | 6/2012 |
| WO | 2013055175 | 4/2013 |

* cited by examiner (a)

(b)

(a)　　　　　　　　　　　　(b)

METHOD AND DEVICE FOR TRANSMITTING RECEPTION CONFIRMATION RESPONSE IN WIRELESS COMMUNICATION SYSTEM

This application is a 35 USC § 371 National Stage entry of International Application No. PCT/KR2014/004005 filed on May 7, 2014, and claims priority to U.S. Provisional Application No. 61/819,667 filed on May 6, 2013, all of which are hereby incorporated by reference in their entireties as if fully set forth herein.

FIELD OF THE INVENTION

The following description relates to a wireless communication system and, more particularly, to a method and device for transmitting reception confirmation response in Device-to-Device (D2D) communication.

BACKGROUND ART

The wireless communication system is being extensively developed in order to provide diverse types of communication devices, such as voice or data services, and so on. Generally, a wireless communication system corresponds to a multiple access system that can support communication with multiple users by sharing an available system source (bandwidth, transmission power, and so on). Examples of the multiple access system may include a CDMA (code division multiple access) system, a FDMA (frequency division multiple access) system, a TDMA (time division multiple access) system, an OFDMA (orthogonal frequency division multiple access) system, a SC-FDMA (single carrier frequency division multiple access) system, a MC-FDMA (multi carrier frequency division multiple access) system, and so on.

Device-to-Device (D2D) communication refers to a communication method that can directly send and receive voice, data, and so on, to and from user equipments without passing through a base station (evolved NodeB; eNB) by setting up a direct link between User Equipments (UEs). D2D communication may include methods, such as user equipment-to-user equipment (UE-to-UE) communication, Peer-to-Peer communication, and so on. Additionally, the D2D communication method may also be applied to M2M (Machine-to-Machine) communication, MTC (Machine Type Communication), and so on.

D2D communication is being considered as one of many solutions for resolving the load of the base station caused by the data traffic, which is increasing at a vast rate. For example, since data can be sent and received to and from user equipments without passing through the base station, unlike in a conventional (or legacy) wireless communication system, network overload may be reduced when using D2D communication.

DETAILED DESCRIPTION OF THE INVENTION

Technical Objects

A technical object of the present invention is to provide a method for transmitting a reception confirmation response in a D2D groupcast.

The technical objects of the present invention will not be limited only to the objects described above. Accordingly, technical objects that have not been mentioned above or additional technical objects of the present application may become apparent to those having ordinary skill in the art from the description presented below.

Technical Solutions

A first technical aspect of the present invention corresponds to a method for transmitting and receiving signals between devices in a wireless communication system, and the signal transmission and reception method includes the steps of receiving, by a first device, a signal from a second device; and transmitting, by the first device, a reception confirmation response respective to the signal, wherein a resource region in which the reception confirmation response is transmitted is differentiated according to whether the reception confirmation response is ACKnowledgement (ACK) or Negative ACKnowledgement (NACK), and wherein the resource region in which the reception confirmation response is transmitted is commonly used for devices which have received the signal.

The first technical aspect of the present invention may include the following features.

Among the resource regions in which the reception confirmation response is transmitted, in case an energy equal to or greater than a predetermined value is detected from a resource region corresponding to the Negative ACKnowledgement (NACK), the signal transmission and reception method may further include a step of receiving a re-transmission related to the signal.

The re-transmission related to the signal may be broadcasted by the first device.

The signal may be multi-casted to devices of a group in which the first device is included.

The resource region in which the reception confirmation response is transmitted may be capable of using only a device having a pathloss that is greater than a predetermined value.

The transmission power for the first device uses to transmit the reception confirmation response may be proportional to a pathloss between the first device and the second device.

The resource region in which the reception confirmation response is transmitted may be configured for each device group, wherein each device group being is decided in accordance with the pathloss.

A second technical aspect of the present invention corresponds to a method for transmitting and receiving signals between devices in a wireless communication system, and the signal transmission and reception method includes the steps of transmitting, by a second device, a signal; and receiving, from a first device receiving the signal, a reception confirmation response respective to the signal, wherein a resource region in which the reception confirmation response is received is differentiated according to whether the reception confirmation response is ACKnowledgement (ACK) or Negative ACKnowledgement (NACK), and wherein the resource region in which the reception confirmation response is received is commonly used for devices which have received the signal.

The second technical aspect of the present invention may include the following features.

Among the resource regions in which the reception confirmation response is transmitted, in case an energy equal to or greater than a predetermined value is detected from a resource region corresponding to the Negative ACKnowledgement (NACK), the signal transmission and reception method may further include a step of performing a re-transmission related to the signal.

The re-transmission related to the signal may be broadcasted.

The signal may be multi-casted to devices of a group in which the first device is included.

The resource region in which the reception confirmation response is transmitted may be capable of using only a device having a pathloss that is greater than a predetermined value.

The transmission power for the first device uses to transmit the reception confirmation response may be proportional to a pathloss between the first device and the second device.

The resource region in which the reception confirmation response is transmitted may be configured for each device group, each device group being decided in accordance with the pathloss.

Effects of the Invention

According to the present invention, a number of channels/resources required for transmitting a reception confirmation response in a groupcast may be reduced.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application.

BRIEF DESCRIPTION OF THE DRAWINGS

The accompanying drawings, which are given to provide a further understanding of the present invention, illustrate diverse exemplary embodiments of the present invention and describe the principles of the present invention along with the detailed description.

MODE FOR CARRYING OUT THE PRESENT INVENTION

Figure 1:
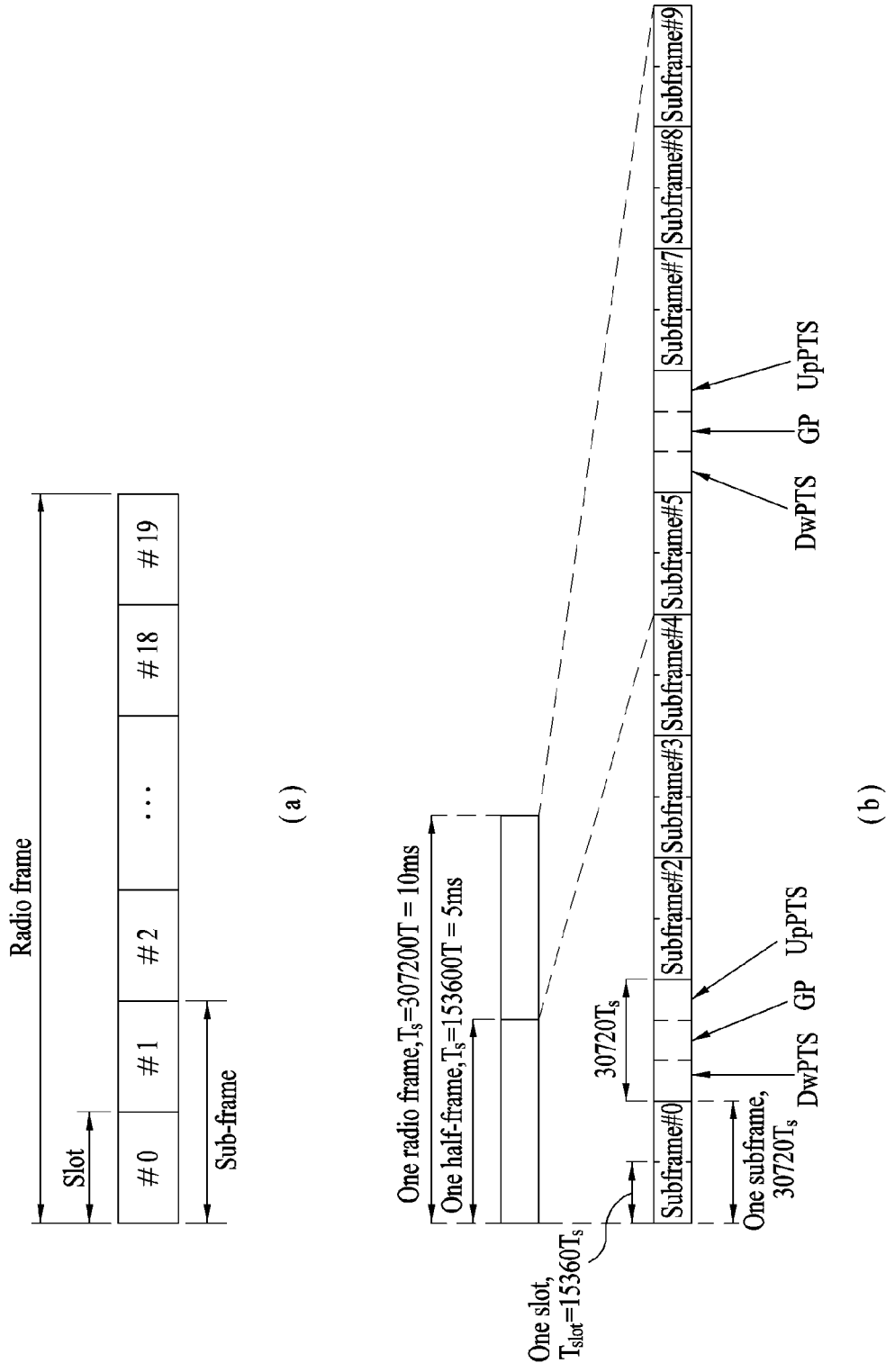
FIG. 1 illustrates a structure of a radio frame (or wireless frame).

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
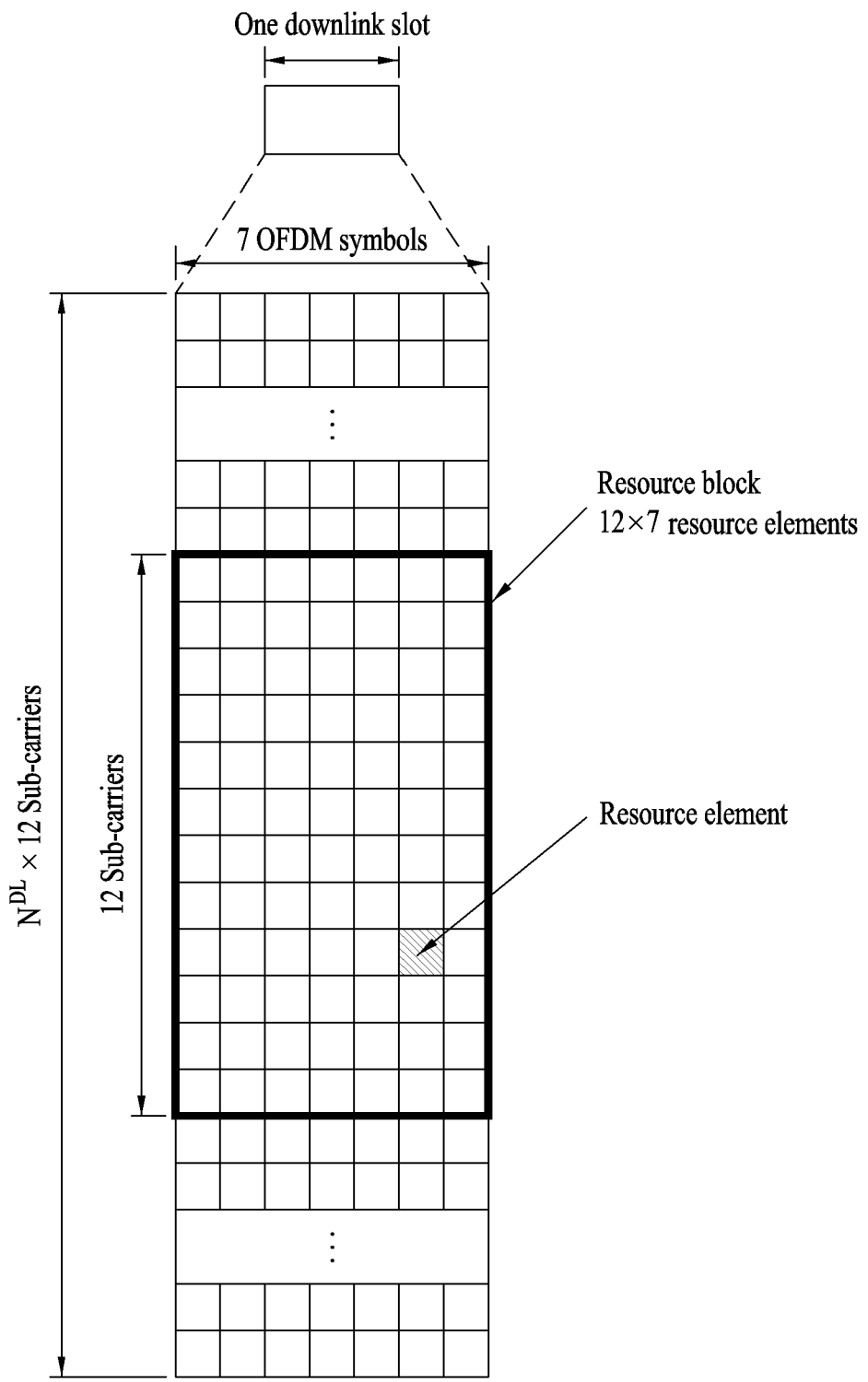
FIG. 2 illustrates a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
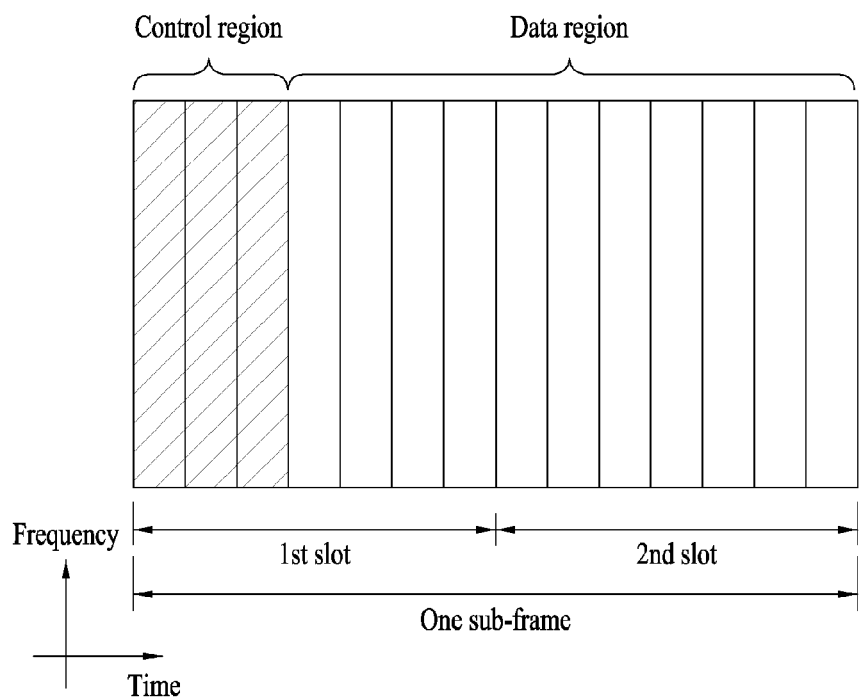
FIG. 3 illustrates a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
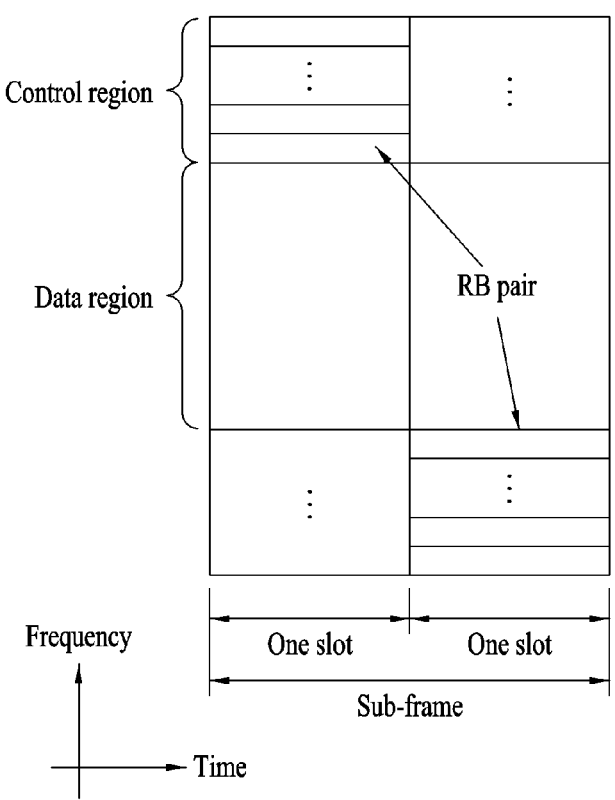
FIG. 4 illustrates a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

PUCCH

UL control information (UCI) transmitted over a PUCCH may include a scheduling request (SR), HARQ ACK/NACK information, and DL channel measurement information.

The HARQ ACK/NACK information may be generated depending on whether decoding of a DL data packet on a PDSCH is successful. In a conventional wireless communication system, 1 bit is transmitted as ACK/NACK information for DL single codeword transmission and 2 bits are transmitted as ACK/NACK information DL 2-codeword transmission.

The channel measurement information may refer to feedback information associated with a multiple input multiple output (MIMO) scheme and include a channel quality indicator (CQI), a precoding matrix index (PMI), and a rank indicator (RI). The channel measurement information may be collectively referred to as CQI. 20 bits may be used per subframe to transmit CQI.

The PUCCH may be demodulated using a binary phase shift keying (BPSK) scheme and a quadrature phase shift keying (QPSK) scheme. Control information of a plurality of UEs may be transmitted over the PUCCH. When code division multiplexing (CDM) is performed to distinguish between signals of UEs, constant amplitude zero autocorrelation (CAZAC) with a length of 12 is mainly used. The CAZAC sequence has characteristics of maintaining a constant amplitude in the time domain and frequency domain and thus is suitable for reduction in peak-to-average power ratio (PAPR) or cubic metric (CM) of a UE to increase coverage. In addition, ACK/NACK information in response to DL data transmitted over a PUCCH is covered using an orthogonal sequence or orthogonal cover (OC).

In addition, control information transmitted on a PUCCH may be distinguished using cyclically shifted sequences having different cyclic shift (CS) values. A cyclically shifted sequence may be generated by cyclically shifting a base sequence by a specific CS amount. The specific CS amount is indicated by a CS index. The number of available CSs may change depending on channel delay spread. Various types of sequences may be used as the base sequence and the aforementioned CAZAC sequence is an example of the base sequence.

In addition, the amount of control information that a UE can transmit in a subframe may be determined depending on the number of SC-FDMA symbols (i.e., SC-FDMA symbols except for an SC-FDMA symbol used to transmit a reference signal (RS) for coherent detection of PUCCH) that can be used to transmit the control information.

In 3GPP LTE, a PUCCH is defined in seven different formats according to transmitted control information, a modulation scheme and the amount of control information. Attributes of transmitted uplink control information (UCI) for each PUCCH format may be summarized as shown in [Table 1].

TABLE 1

| PUCCH format | Modulation Scheme | Number of bits per subframe | Usage | Etc. |
|---|---|---|---|---|
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

PUCCH format 1 is used to transmit an SR only. When the SR is transmitted alone, an unmodulated waveform is applied, which will be described in detail below.

PUCCH format 1a or 1b is used for transmission of HARQ ACK/NACK. When only HARQ ACK/NACK is transmitted in a subframe, PUCCH format 1a or 1b may be used. Alternatively, HARQ ACK/NACK and SR may be transmitted in the same subframe using PUCCH format 1a or 1b.

PUCCH format 2 is used for transmission of CQI, whereas PUCCH format 2a or 2b is used for transmission of CQI and HARQ ACK/NACK. For the extended CP, PUCCH format 2 may be used for transmission of CQI and HARQ ACK/NACK.

Figure 5:
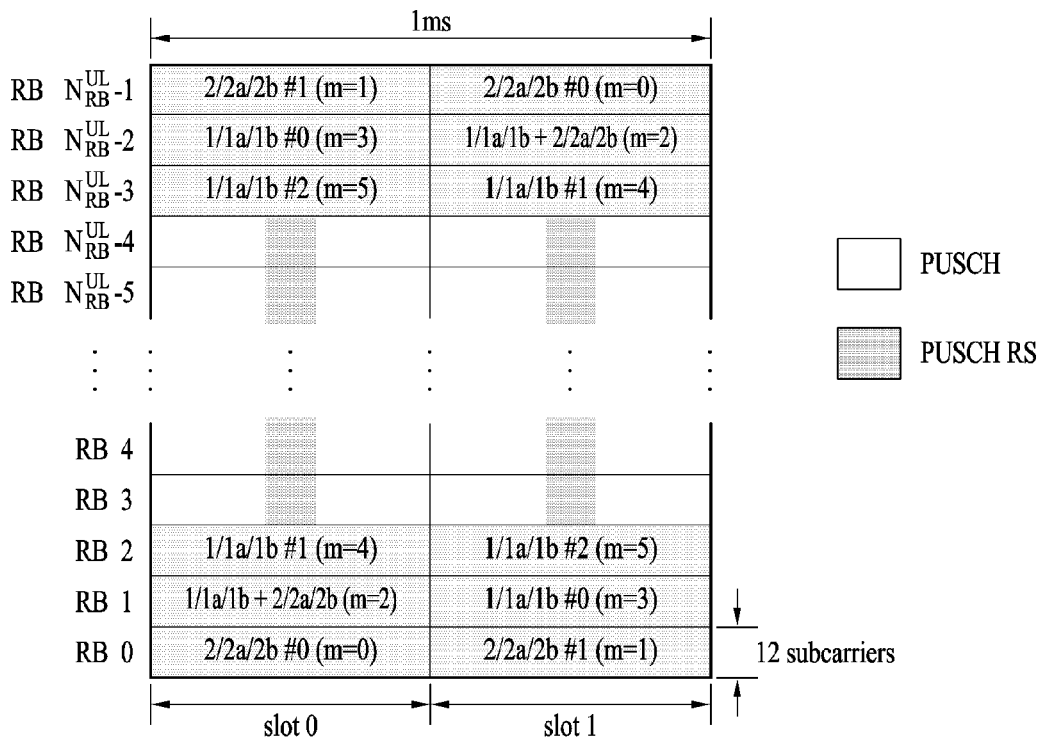
FIG. 5 illustrates diverse forms of PUCCH formats being mapped in an uplink physical resource block.

FIG. 5 illustrates mapping of PUCCH formats to PUCCH regions in UL physical resource blocks. In FIG. 5, $n_{PUCC1}^{(2)}$ denotes the number of resource blocks on UL, and 0, 1, . . . , $n_{PUCC1}^{(2)}-1$ represents physical resource block numbers. Basically, a PUCCH is mapped to opposite edges of a UL frequency block. As illustrated in FIG. 5, PUCCH formats 2/2a/2b are mapped to PUCCH regions indicated by m=0 and 1, which may Represent that PUCCH formats 2/2a/2b are mapped to resource blocks positioned at the band-edges. In addition, PUCCH formats 2/2a/2b and PUCCH formats 1/1a/1b may be mixed and mapped to a PUCCH region indicated by m=2. PUCCH formats 1/1a/1b may be mapped to PUCCH regions indicated by m=3, 4, and 5. The number ($n_{PUCC}^{(1)}$) of available PUCCH RBs may be indicated to UEs in a cell by the PUCCH format 2/2a/2b, through broadcast signaling.

PUCCH Resources

A BS allocates a PUCCH resource for UCI transmission to a UE in an implicit or explicit manner through higher layer signaling.

For ACK/NACK, a plurality of PUCCH resource candidates may be set for the UE by a higher layer. Of the PUCCH resource candidates, a PUCCH resource to be used by the UE may be determined in an implicit manner. For example, the UE may receive a PDSCH from the BS and transmit ACK/NACK for a corresponding data unit through a PUCCH resource implicitly determined by a PDCCH resource that carries scheduling information about the PDSCH.

Figure 6:
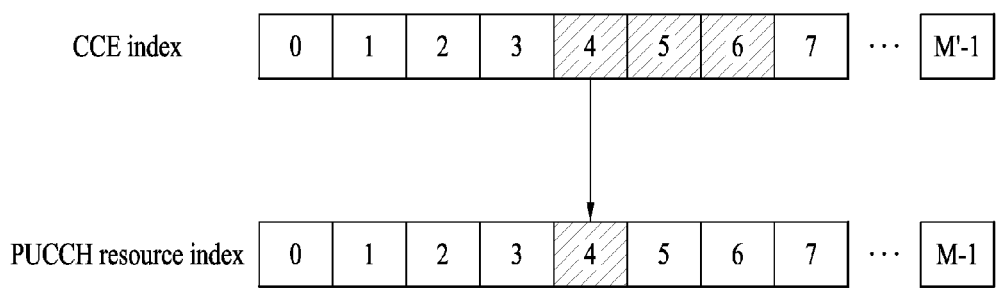
FIG. 6 illustrates an example of deciding a PUCCH resource for ACK/NACK.

FIG. 6 illustrates an example of determining PUCCH resources for ACK/NACK.

In LTE, a PUCCH resource for ACK/NACK information is not pre-allocated to UEs. Rather, PUCCH resources are used separately by a plurality of UEs within a cell at each time. Specifically, a PUCCH resource that a UE uses to transmit ACK/NACK is implicitly determined based on a PDCCH carrying scheduling information about a PDSCH that delivers the DL data. An entire area in which a PDCCH is transmitted in a DL subframe includes a plurality of control channel elements (CCEs) and a PDCCH transmitted to a UE includes one or more CCEs. A CCE includes a plurality of (e.g., 9) resource element groups (REGs). One REG includes four resource elements (REs) that neighbors each other with an RS excluded. The UE transmits ACK/NACK through an implicit PUCCH resource that is derived or calculated according to a function of a specific CCE index (e.g., the first or lowest CCE index) from among the CCE indexes included in a PDCCH received by the UE.

Referring to FIG. 6, each PUCCH resource index corresponds to a PUCCH resource for ACK/NACK. As illustrated in FIG. 6, suppose that scheduling information about the PDSCH is transmitted to the UE on a PDCCH including CCEs #4, #5 and #6. The UE transmits ACK/NACK to a BS on a PUCCH, for example, PUCCH #4 that is derived or calculated from the lowest CCE index 4 constituting the PDCCH. FIG. 6 illustrates a case in which up to M' CCEs are present in the DL and up to M PUCCHs are present in UL. M may be equal to M', but it is also possible to set M to be different from M' and to map CCEs to PUCCHs in an overlapping manner.

For example, a PUCCH resource index may be determined by the following equation.

$$n_{PUCCH}^{(1)} = n_{CCE} + N_{PUCCH}^{(1)}$$ [Equation 1]

Herein, $n_{PUCCH}^{(1)}$ denotes the index of a PUCCH resource for transmission of ACK/NACK, and $N_{PUCCH}^{(1)}$ denotes a signaling value received from a higher layer. $n_{CCE}$ may denote the lowest index of the CCE indexes used for transmission of a PDCCH.

PUCCH Channel Structure

PUCCH formats 1a/1b will be described first below.

In PUCCH formats 1a/1b, a symbol modulated using BPSK or QPSK is multiplied by a CAZAC sequence having a length of 12. For example, multiplying a modulation symbol d(0) by a CAZAC sequence r(n) (n=0, 1, 2, . . . , N−1) having a length of N gives a result of y(0), y(1), y(2), . . . , y(N−1). Symbols y(0), y(1), y(2), . . . , and y(N−1) may be called a block of symbols. After the modulation symbol is multiplied by the CAZAC sequence, block-wise-spreading using an orthogonal sequence is applied.

A Hadamard sequence with a length of 4 is employed for general ACK/NACK information, while a discrete Fourier transform (DFT) with a length of 3 is employed for shortened ACK/NACK information and a reference signal. For an extended CP, a Hadamard sequence with a length of 2 is employed for a reference signal.

Figure 7:
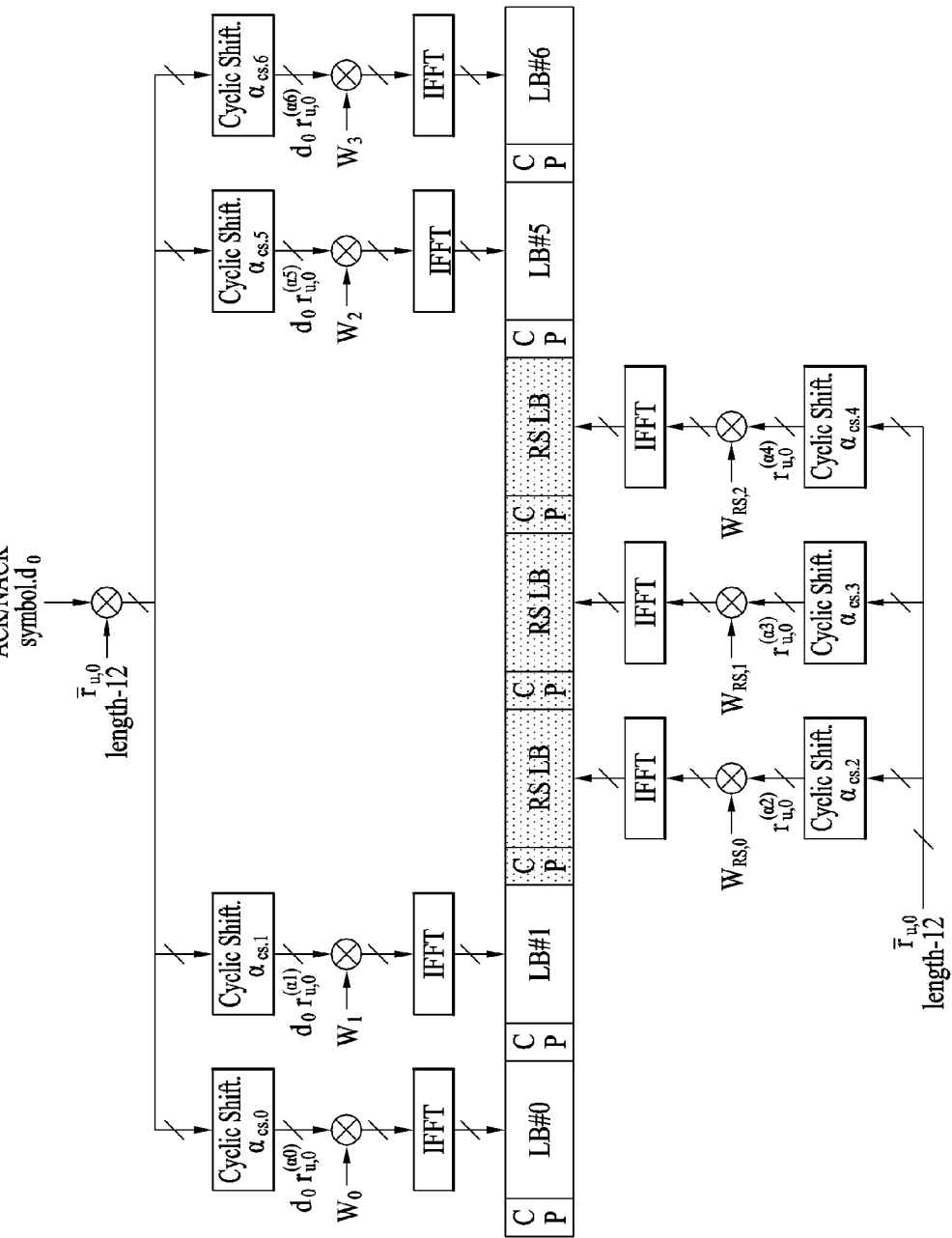
FIG. 7 illustrates a structure of an ACK/NACK channel in case of a normal CP.

FIG. 7 illustrates an ACK/NACK channel structure for a normal CP. FIG. 7 exemplarily shows the structure of a PUCCH channel for transmission of HARQ ACK/NACK without CQI. Three consecutive SC-FDMA symbols in the middle of seven SC-FDMA symbols carry RSs and the remaining four SC-FDMA symbols carry ACK/NACK signals. For the extended CP, two consecutive symbols in the middle of SC-FDMA symbols may carry RSs. The number and positions of symbols used for an RS may change depending on a control channel, and the number and positions of symbols used for a ACK/NACK signal associated with the RS may change depending on the number and positions of symbols used for the RS.

1-bit ACK/NACK information and 2-bit ACK/NACK information (which is unscrambled) may be represented in a HARQ ACK/NACK modulation symbol using BPSK and QPSK, respectively. ACK may be encoded as 1, and NACK may be encoded as 0.

When a control signal is transmitted within an allocated band, 2-dimensional spreading is applied to enhance multiplexing capacity. That is, frequency domain spreading and time domain spreading are simultaneously applied to increase the number of UEs or control channels that can be multiplexed. To spread an ACK/NACK signal in the frequency domain, a frequency domain sequence is used as a basic sequence. A Zadoff-Chu (ZC) sequence, one of CAZAC sequences, may be used as the frequency domain sequence. For example, different cyclic shifts (CSs) may be applied to a ZC sequence, which is the basic sequence, to multiplex different UEs or different control channels. The number of CS resources supported by SC-FDMA symbols for PUCCH RBs for HARQ ACK/NACK transmission is set by a cell-specific higher-layer signaling parameter ($\Delta_{shift}^{PUCCH}$), and $\Delta_{shift}^{PUCCH} \in \{1, 2, 3\}$ represents 12, 6 or 4 shifts.

A frequency-domain-spread ACK/NACK signal is spread in the time domain using an orthogonal spreading code. As the orthogonal spreading code, a Walsh-Hadamard sequence or a DFT sequence may be used. For example, the ACK/NACK signal may be spread using orthogonal sequences (w0, w1, w2, w3) with a length of 4 for four symbols. In addition, the RS may also be spread using an orthogonal sequence with a length of 3 or 2, which is referred to as orthogonal covering (OC).

A plurality of UEs may be multiplexed in a code division multiplexing (CDM) scheme using CS resources in the frequency domain and OC resources in the time domain as described above. That is, ACK/NACK information and RSs of a large number of UEs may be multiplexed on the same PUCCH RB.

In time domain spreading CDM, the number of supported spreading codes for the ACK/NACK information is restricted by the number of RS symbols. That is, the number of SC-FDMA symbols for RS transmission is smaller than the number of SC-FDMA symbols for ACK/NACK transmission, and therefore multiplexing capacity of an RS is lower than multiplexing capacity of the ACK/NACK information. For example, in the case of a normal CP, the ACK/NACK information may be transmitted in four symbols, but three orthogonal spreading codes are used rather than four orthogonal spreading codes for the ACK/NACK information. This is because the number of RS transmission symbols is limited to three and thus only three orthogonal spreading codes can be used for the RS.

Examples of an orthogonal sequence used in spreading ACK/NACK information are shown in [Table 2] and [Table 3]. [Table 2] shows a sequence for a symbol having a length of 4 and [Table 3] shows a sequence for a symbol having a length of 3. The sequence for the symbol having a length of 4 is used in PUCCH formats 1/1a/1b of a normal subframe configuration. Considering a case in which an SRS is transmitted on the last symbol of the second slot in a subframe configuration, the sequence for the symbol with the length of 4 may be applied to the first slot and shortened PUCCH formats 1/1a/1b of the sequence for the symbol with the length of 3 may be applied to the second slot.

TABLE 2

| Sequence index $n_{oc}^{(\tilde{p})}$ ($n_s$) | Orthogonal sequences [w(0) ... w($N_{SF}^{PUCCH}$ − 1)] |
|---|---|
| 0 | [+1 +1 +1 +1] |
| 1 | [+1 −1 +1 −1] |
| 2 | [+1 −1 −1 +1] |

TABLE 3

| Sequence index $n_{oc}^{(\tilde{p})}$ ($n_s$) | Orthogonal sequences [w(0) ... w($N_{SF}^{PUCCH}$ − 1)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

When three symbols are used for RS transmission and four symbols are used for ACK/NACK information transmission in a slot of a subframe of the normal CP, if, for example, six CSs in the frequency domain and three OC resources in the time domain are allowed to be used, HARQ ACK/NACK signals from 18 different UEs may be multiplexed in a PUCCH RB. When two symbols are used for RS transmission and four symbols are used for ACK/NACK information transmission in a slot of a subframe of the extended CP, if, for example, six CSs in the frequency domain and two OC resources in the time domain are allowed to be used, HARQ ACK/NACK signals from 12 different UEs may be multiplexed in a PUCCH RB.

Hereinafter, PUCCH format 1 will be described. A scheduling request (SR) is transmitted by requesting scheduling of the UE or not requesting scheduling of the UE. An SR channel reuses an ACK/NACK channel structure in PUCCH formats 1a/1b and is configured in an on-off keying (OOK) manner based on the design of the ACK/NACK channel. An RS is not transmitted on an SR channel. Thus, a sequence with a length of 7 is used in the case of the normal CP, and a sequence with a length of 6 is used in the case of the extended CP. Different CSs or orthogonal covers may be allocated to an SR and ACK/NACK. That is, in implementing transmission of a positive SR, the UE transmits HARQ ACK/NACK through resources allocated for the SR. In implementing transmission of a negative SR, the UE transmits HARQ ACK/NACK through resources allocated for ACK/NACK.

Hereinafter, PUCCH formats 2/2a/2b will be described. PUCCH formats 2/2a/2b are control channels for transmission of channel measurement feedback (CQI, PMI and RI).

A report period of the channel measurement feedback (hereinafter, referred to as CQI information) and a frequency unit (or frequency resolution) subject to measurement may be controlled by a BS. Periodic and aperiodic CQI reports may be supported in the time domain. PUCCH format 2 may be used only for the periodic report and a PUSCH may be used for the aperiodic report. In the case of the aperiodic report, the BS may instruct the UE to transmit an individual CQI report on a resource scheduled for UL data transmission.

Figure 8:
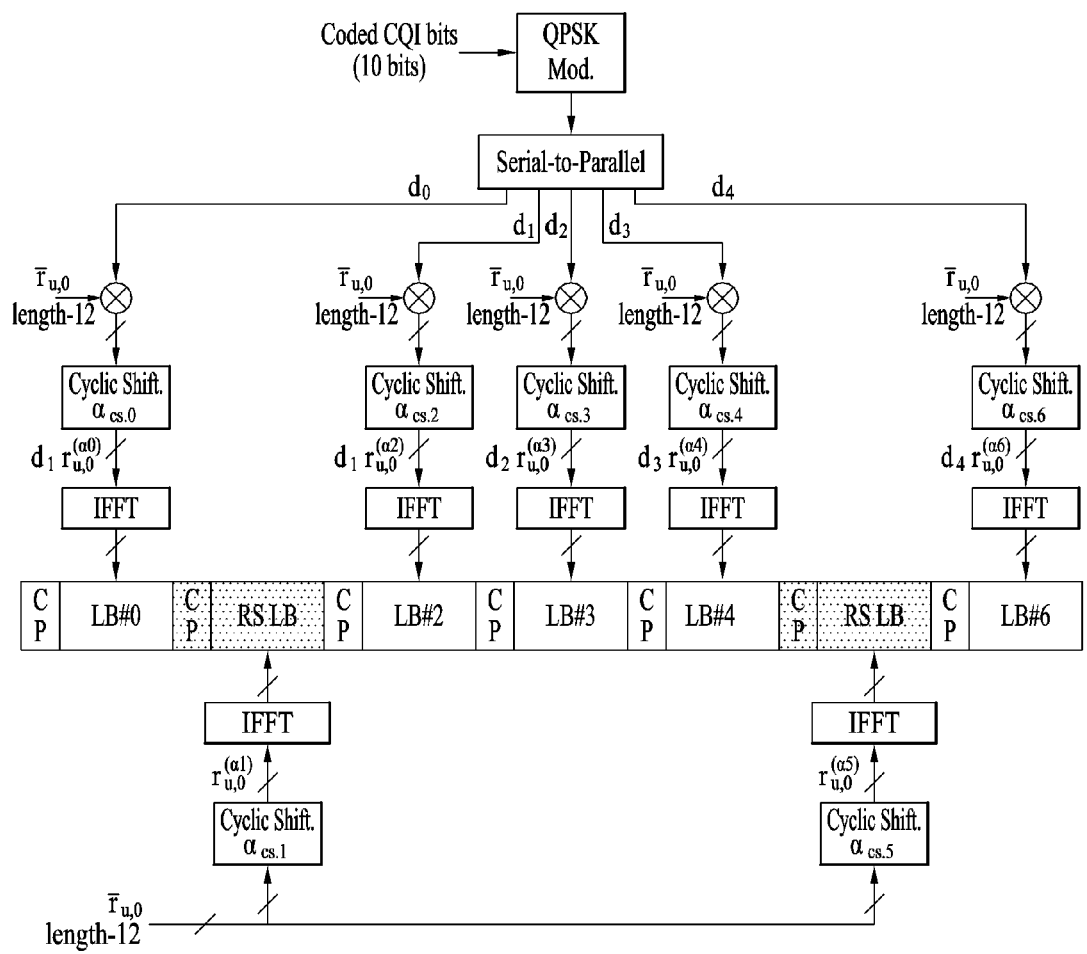
FIG. 8 illustrates a structure of a CQI channel in case of a normal CP.

FIG. 8 illustrates a CQI channel structure for a normal CP. SC-FDMA symbols #1 and #5 (second and sixth symbols) from among SC-FDMA symbols #0 to #6 of a slot may be used to transmit a demodulation reference signal (DMRS), and CQI information may be transmitted in the remaining SC-FDMA symbols. In the case of an extended CP, one SC-FDMA symbol (SC-FDMA symbol #3) is used to transmit the DMRS.

In PUCCH formats 2/2a/2b, modulation by a CAZAC sequence is supported, and a symbol modulated according to QPSK is multiplied by a CAZAC sequence with a length of 12. The CS of the sequence is changed between symbols and between slots. OC is used for the DMRS.

Of the seven SC-FDMA symbols included in a slot, two SC-FDMA symbols spaced apart by an interval of three SC-FDMA symbols carry DMRSs and the remaining five SC-FDMA symbols carry CQI information. Two RSs are used in a slot in order to support a high-speed UE. A UE is identified using a CS sequence. CQI information symbols are modulated into SC-FDMA symbols and transmitted. An SC-FDMA symbol includes a sequence. That is, a UE modulates CQI into each sequence and transmits the sequences.

The number of symbols that can be transmitted in a TTI is 10 and QPSK is determined for modulation of CQI information. When QPSK mapping is employed for the SC-FDMA symbols, an SC-FDMA symbol may carry a 2-bit CQI value and thus a slot may carry a 10-bit CQI value. Accordingly, a maximum of a 20-bit CQI value may be carried in a subframe. To spread the CQI information in the frequency domain, a frequency domain spreading code is used.

A CAZAC sequence with a length of 12 (e.g., a ZC sequence) may be used for the frequency domain spreading code. Control channels may be distinguished from each other using CAZAC sequences having different CS values. The frequency-domain-spread CQI information is subjected to IFFT.

12 different UEs may be orthogonally multiplexed in the same PUCCH RB using 12 equally spaced CSs. For the normal CP, a DMRS sequence on SC-FDMA symbols #1 and #5 (SC-FDMA symbols #3 for the extended CP) is similar to a CQI signal sequence in the frequency domain, but the DMRS sequence is not modulated as in the case of the CQI information. A UE may be semi-statically set by higher layer signaling so as to periodically report different CQI, PMI and RI types on a PUCCH resource indicated by a PUCCH resource index $n_{PUCCH}^{(2)}$. Herein, the PUCCH resource index $N_{PUCCH}^{(2)}$ is information indicating a PUCCH region and a CS value used for PUCCH format 2/2a/2b transmission.

Hereinafter, an enhanced-PUCCH (e-PUCCH) format will be described. The e-PUCCH format may correspond to PUCCH format 3 in LTE-A. Block spreading may be applied to ACK/NACK transmission using PUCCH format 3.

Figure 9:
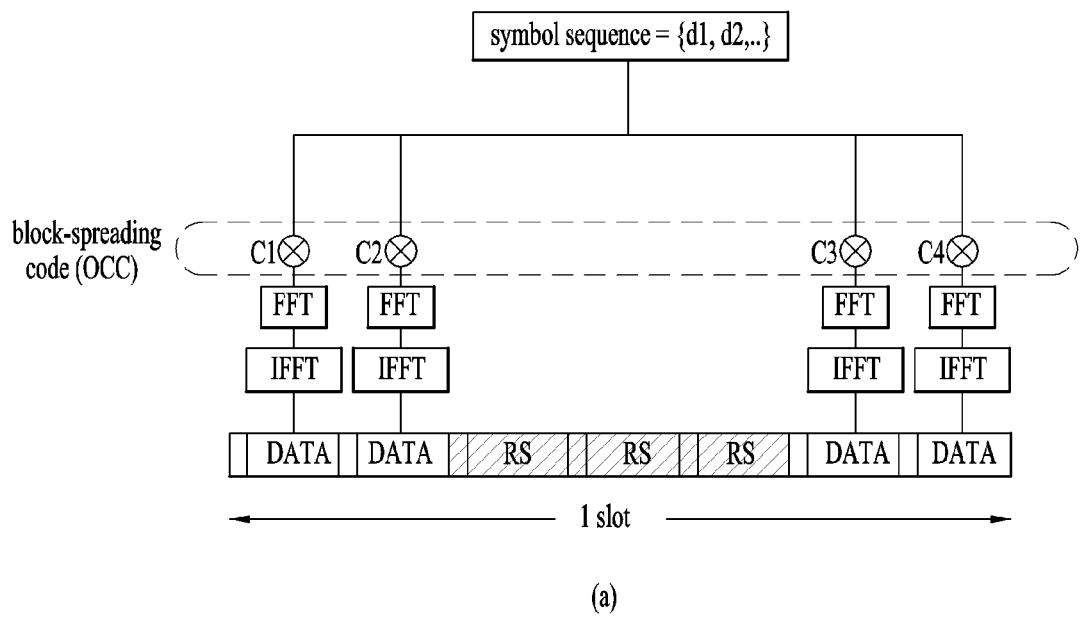
FIG. 9 illustrates a structure of a PUCCH channel structure by using block spreading.
Figure 9:
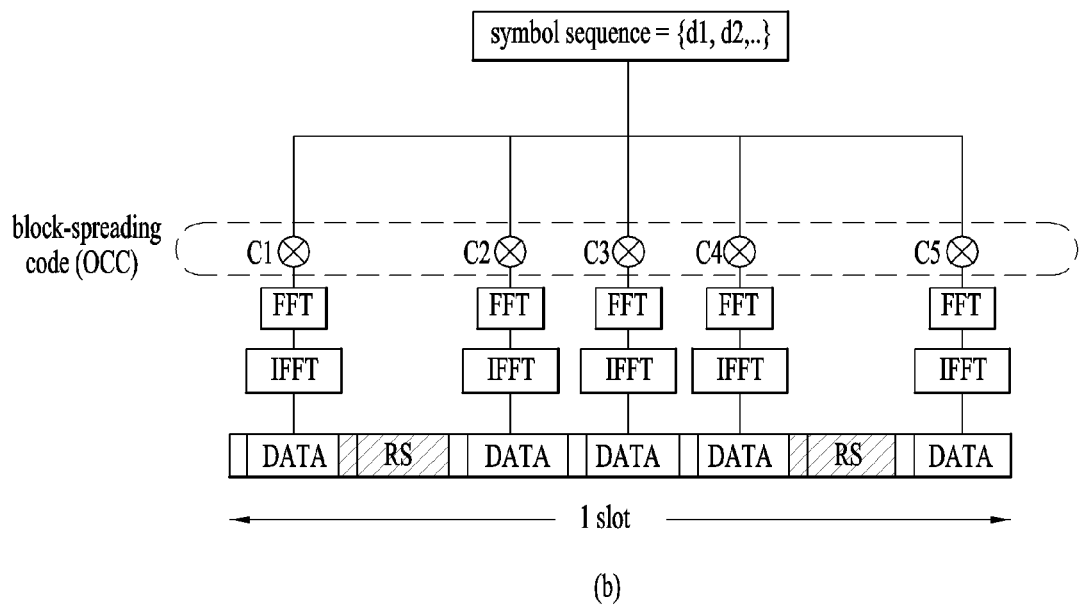

Block spreading is a method of modulating a control signal using SC-FDMA, which is distinguished from the PUCCH format 1 or 2 series. As shown in FIG. 9, a symbol sequence may be spread in the time domain using an orthogonal cover code (OCC) and transmitted. Control signals of a plurality UEs may be multiplexed in the same RB using the OCC. In the case of PUCCH format 2 described above, a symbol sequence is transmitted in the time domain and control signals of multiple UEs are multiplexed using a CS of a CAZAC sequence. On the other hand, in the case of a block spreading-based PUCCH format (e.g., PUCCH format 3), a symbol sequence is transmitted in the frequency domain and control signals of multiple UEs are multiplexed through the time domain spreading based on an OCC.

FIG. 9(a) illustrates an example of generation and transmission of four SC-FDMA symbols (i.e., data portions) using an OCC with a length of 4 (or spreading factor (SF)=4)

in a symbol sequence during one slot. In this case, three RS symbols (i.e., RS portions) may be used in one slot.

FIG. 9(b) illustrates an example of generation and transmission of five SC-FDMA symbols (i.e., data portions) using an OCC with a length of 5 (or SF=5) in a symbol sequence during one slot. In this case, two RS symbols may be used in one slot.

In the examples of FIG. 9, the RS symbols may be generated from a CAZAC sequence to which a specific CS value is applied, and a predetermined OCC may be applied to (or multiplied by) a plurality of RS symbols and transmitted. If 12 modulation symbols are used per OFDM symbol (or SC-FDMA symbol) and each modulation symbol is generated according to QPSK in the examples of FIG. 9, the maximum number of bits that can be transmitted in a slot is 12?2=24. Thus, the total number of bits that can be transmitted in two slots is 48. When the PUCCH channel structure employing the block spreading scheme is used, it may be possible to transmit extended control information compared to the case of existing PUCCH formats 1 and 2.

ACK/NACK Multiplexing Scheme

In ACK/NACK multiplexing, content of an ACK/NACK to a plurality of data units may be identified by a combination of an ACK/NACK unit actually used for ACK/NACK transmission and one of QPSK-modulated symbols. For example, suppose that an ACK/NACK unit carries 2-bit information and receives a maximum of two data units. Herein, it is assumed that a HARQ ACK/NACK for each of the received data units is represented by an ACK/NACK bit. In this case, a transmitter that has transmitted data may identify the ACK/NACK results as shown below in [Table 4].

TABLE 4

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In [Table 4], HARQ-ACK(i) (1=0, 1) represents an ACK/NACK result with respect to data unit i. Since a maximum of two data units (data unit 0 and data unit 1) is assumed to be received as described above, an ACK/NACK result with respect to data unit 0 is represented as HARQ-ACK(0) and an ACK/NACK result with respect to data unit 1 is represented as HARQ-ACK(1) in [Table 4]. Referring to [Table 4], DTX (Discontinuous Transmission) indicates that the data unit corresponding to HARQ-ACK(i) is not transmitted or that a receiver cannot detect presence of the data unit corresponding to HARQ-ACK(i). In addition, $n_{PUCCH,X}^{(1)}$ denotes an ACK/NACK unit actually used for ACK/NACK transmission. When there is a maximum of two ACK/NACK units, the ACK/NACK units may be represented as $n_{PUCCH,0}^{(1)}$ and $n_{PUCCH,1}^{(1)}$. In addition, b(0), b(1) denote two bits transmitted by selected ACK/NACK units. Modulation symbols transmitted through ACK/NACK units are determined depending on bits of b(0) and b(1).

For example, when the receiver successfully receives and decodes two data units (as indicated by ACK, ACK in [Table 4]), the receiver transmits two bits (1, 1) using the ACK/NACK unit $n_{PUCCH,1}^{(1)}$. If the receiver fails to decode (or detect) the first data unit (i.e., data unit 0 corresponding to HARQ-ACK(0)) of the two received data units and successfully decodes the second data unit (i.e. data unit 1 corresponding to HARQ-ACK(1)) (as indicated by NACK/DTX, ACK in [Table 4]), the receiver transmits two bits (0, 0) using the ACK/NACK unit $n_{PUCCH,1}^{(1)}$.

As such, it is possible to transmit ACK/NACK information about a plurality of data units using one ACK/NACK unit by linking or mapping a combination of a selected ACK/NACK unit and actual bits of the transmitted ACK/NACK unit (i.e., a combination of selected $n_{PUCCH,0}^{(1)}$ or $n_{PUCCH,1}^{(1)}$ and b(0), b(1) in [Table 4]) to the content of actual ACK/NACK. ACK/NACK multiplexing for more than two data units may be readily implemented by extending the principle of the above-described ACK/NACK multiplexing.

In the ACK/NACK multiplexing scheme described above, NACK and DTX may not be discriminated from each other when at least one ACK is present for each data unit (that is, NACK and DTX may be coupled as NACK/DTX as shown in [Table 4]). This is because all ACK/NACK states (i.e., ACK/NACK hypotheses) that may be generated when NACK and DTX are discriminated from each other cannot be represented by only combinations of ACK/NACK units and QPSK-modulated symbols. When ACK is not present for any data unit (i.e., when only NACK or DTX is present for all data units), a single definite case of NACK indicating that only one of HARQ-ACKs(i) is a definite NACK (i.e., NACK discriminated from DTX) may be defined. In this case, an ACK/NACK unit corresponding to a data unit for a definite NACK may be reserved for transmission of a plurality of ACK/NACK signals.

PUCCH Piggyback

In UL transmission in a legacy 3GPP LTE system (e.g., a Release-8 system), single carrier transmission with good cubic metric (CM) property or a good peak-to-average power ratio (PAPR), which affects performance of a power amplifier, is maintained to effectively utilize the power amplifier of the UE. That is, single carrier characteristics of data to be transmitted may be maintained through DFT-precoding in the case of PUSCH transmission in the legacy LTE system. In the case of PUCCH transmission, single carrier characteristics may be maintained by carrying information on a sequence having single carrier characteristics. However, if DFT-precoded data is non-continuously assigned on a frequency axis, or if PUSCH and PUCCH are simultaneously transmitted, such single carrier characteristics are not maintained.

Figure 10:
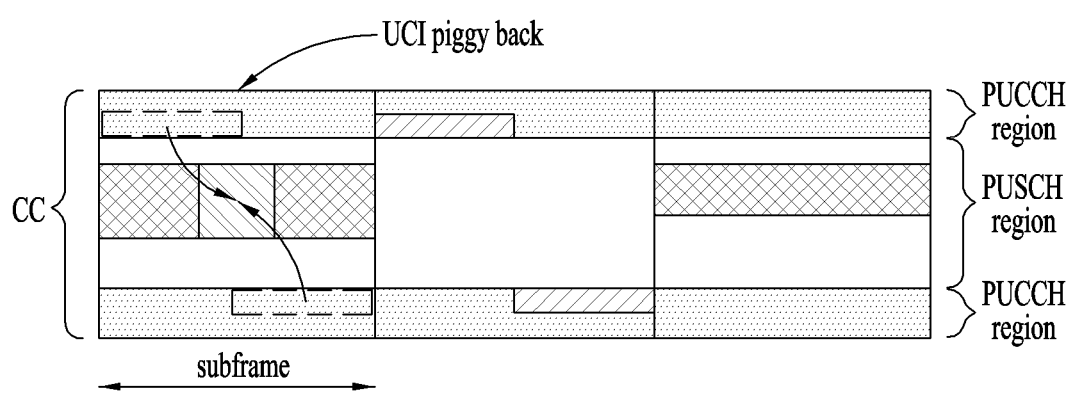
FIG. 10 illustrates a method for transmitting uplink control information through a PUSCH.

Thus, when PUSCH transmission takes place in the same subframe as that for PUCCH transmission as illustrated in FIG. 10, uplink control information (UCI) to be transmitted on a PUCCH may be piggybacked together with data over a PUSCH in order to maintain the single carrier characteristics.

As described before, since a legacy LTE UE cannot transmit a PUCCH and a PUSCH simultaneously, UCI (a CQI/PMI, an HARQ-ACK, an RI, etc.) is multiplexed into a PUSCH region in a subframe carrying a PUSCH. For example, if a CQI and/or a PMI is to be transmitted in a subframe allocated for PUSCH transmission, control information and data may be transmitted together by multiplexing UL-SCH data with the CQI/PMI before DFT-spreading. In this case, the UL-SCH data is rate-matched in consideration of CQI/PMI resources. The control information such as an HARQ ACK, an RI, etc. may be multiplexed into the PUSCH region by puncturing the UL-SCH data.

Transmission of a Reception Confirmation Response in TDD

Figure 11:
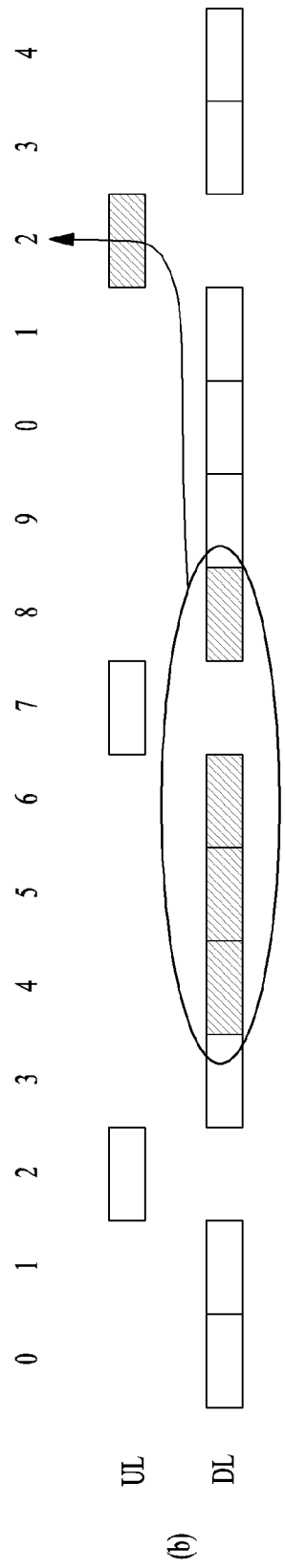
FIG. 11 illustrates a reception confirmation response in TDD.

Meanwhile, unlike the case of FDD, in TDD, since the uplink (UL) and the downlink (DL) are not separated from one another with the frequency band, a case when reception confirmation responses respective to multiple downlink subframes (of the PDSCH) shall be transmitted from one uplink subframe may occur. This will hereinafter be described in detail with reference to FIG. 11. FIG. 11(a) illustrates an Uplink-downlink configuration that is used in TDD, and FIG. 11(b) illustrates a reception confirmation response respective to a case of a TDD uplink-downlink configuration 2. Referring to FIG. 11, in case of the TDD uplink-downlink configuration 2, the subframes that can be used for uplink (or subframes that are available for uplink) are limited to Subframe number 2 and Subframe number 7. Accordingly, reception confirmation responses respective to 8 downlink subframes (including the special subframe) are required to be transmitted through the two uplink subframes (Subframe number 2 and Subframe number 7). In order to so, downlink related set indexes are defined in Table 5 shown below.

(or last previous) radio frame, parentheses [ ] signify that the subframe corresponds to a subframe of the current radio frame, and an index having no parentheses signifies that the subframe corresponds to a second previous (or second-to-last previous) radio frame.

Hereinafter, based upon the description provided above, the transmission and reception of a reception confirmation response in D2D communication will be described in detail. Most particularly, if groupcast is being performed in D2D communication, the reception confirmation response may become a large burden in the system operation. Herein, groupcast refers to a device-to-device (D2D) network (or an inter-device network), wherein any device from a group including two or more devices may become a source or destination in information transmission. In the groupcast, when any one device transmits information, all of the devices within the group or all of the device subgroup may decode the transmitted information.

Figure 12:
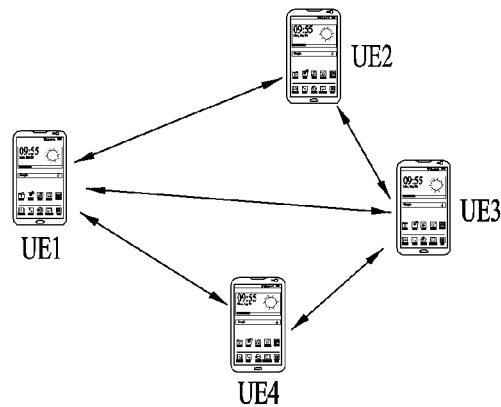
FIG. 12 illustrates an exemplary groupcast in D2D communication.

An example of such groupcast is illustrated in FIG. 12. In FIG. 12, a first device to a fourth device (UE1~UE4)

TABLE 5

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | (6) | — | [4] | — | — | [6] | — | [4] |
|   | — | — | (6) | — | [0] | — | — | [1] | — | [5] |
| 1 | — | — | (7, 6) | (4) | — | — | — | [7, 6] | [4] | — |
|   | — | — | (5, 6) | (9) | — | — | — | [0, 1] | [4] | — |
| 2 | — | — | (6, 7, 4, 6) | — | — | — | — | (8), [7, 4, 6] | — | — |
|   | — | — | (4, 5, 8, 6) | — | — | — | — | (9), [0, 3, 1] | — | — |
| 3 | — | — | (7, 6, 11) | (6, 5) | (5), [4] | — | — | — | — | — |
|   | — | — | (5, 6, 1) | (7, 8) | (9), [0] | — | — | — | — | — |
| 4 | — | — | (12, 8, 7, 11) | (6, 5, 4, 7) | — | — | — | — | — | — |
|   | — | — | (0, 4, 5, 1) | (7, 8, 9, 6) | — | — | — | — | — | — |
| 5 | — | — | 13, (12, 9, 8, 7, 5, 4, 11, 6) | — | — | — | — | — | — | — |
|   | — | — | 9, (0, 3, 4, 5, 7, 8, 1, 6) | — | — | — | — | — | — | — |
| 5 | — | — | (7) | (7) | (5) | — | — | [7] | [7] | — |
|   | — | — | (5) | (6) | (9) | — | — | [0] | [1] | — |

The downlink related set K is configured on elements of $\{k_0, k_1, \ldots k_{M-1}\}$ in each uplink subframe, and M (bundling window size) signifies a number of downlink subframes being required to transmit a reception configuration response in the related set K. In each uplink-downlink configuration of Table 5 presented above, each of the indexes (or numbers) on the first row indicates a number of subframes from which the corresponding downlink subframe precedes the current uplink subframe. For example, in case of the uplink-downlink configuration 2, as shown in FIG. 11(b), Subframe number 2 transmits a reception confirmation response (ACKnowledgement (ACK)/Negative ACKnowledgement (NACK)) of the $8^{th}$, $7^{th}$, $4^{th}$, and $6^{th}$ preceding subframes (i.e., number 4, number 5, number 8, and number 6 of the previous radio frame). In order to facilitate the understanding, subframe numbers being respectively indicated by the indexes of the first row are indicated on the second row of each uplink-downlink configuration. In case of uplink-downlink configuration 2, indexes 4, 5, 8, and 6 are indicated on the second row, and theses indexes represent the indexes (or numbers) of the downlink subframes that are required to transmit the reception confirmation response from Subframe number 2. Additionally, in Table 5, parentheses ( ) signify that the subframe corresponds to a subframe of the previous configure one group. When the first device (UE1) performs groupcast, the second device to fourth device shall feedback an ACKnowledgment (ACK)/Negative ACKnowledgement (NACK) to the first device. If the number of device within a group is equal to N, and, if N number of devices perform groupcast, (N−1)^N number of ACK/NACK feedback may be required. More specifically, in case of a groupcast, since ACK/NACK feedback exponentially increasing (or incrementing) with respect to N is being required, this may act as a large burden to the system. Therefore, hereinafter, diverse methods for reducing the number of ACK/NACK feedback channels in groupcast will be described. In the following description, any one of the following two methods may be applied as the HARQ transmission method. Firstly, in case transmission respective to some of the devices in the groupcast is not performed properly, re-transmission may be performed to all devices (by using a common resource) in a broadcast/groupcast format. At this point, devices that have successfully performed decoding during the previous transmission may turn off their receiver circuits. Secondly, in case transmission respective to some of the devices in groupcast has failed, re-transmission may be performed with respect to the corresponding devices (by using dedicated resources).

Exemplary Embodiment 1-1

D2D data reception device(s) (first device(s)) may read a control channel (this may correspond to a control channel CRC-masked by a group RNTI) transmitted from D2D data transmission device (s) (second device(s)) and may decide whether or not to decode data. At this point, a reception confirmation response being transmitted with respect to the D2D transmission device may be transmitted. At this point, in order to reduce the number of ACK/NACK feedback channels, the reception confirmation responses may be transmitted at the same time through the same channel (this includes channel of the same frequency band). In other words, a resource region from which the reception confirmation response is transmitted may be commonly used by the D2D data reception devices. Additionally, this resource region from which the reception confirmation response is transmitted may be differentiated/identified in accordance with whether the reception confirmation response corresponds to an ACK or a NACK. In other words, a resource, which is used when devices having received a specific groupcast signal transmit any one of an ACK and a NACK at the same time, may be individually configured as a resource for ACK and a resource for NACK. The D2D devices may transmit ACK/NACK by performing OOK (on/off keying) modulation from the respective resource regions each being individually configured.

Figure 13:
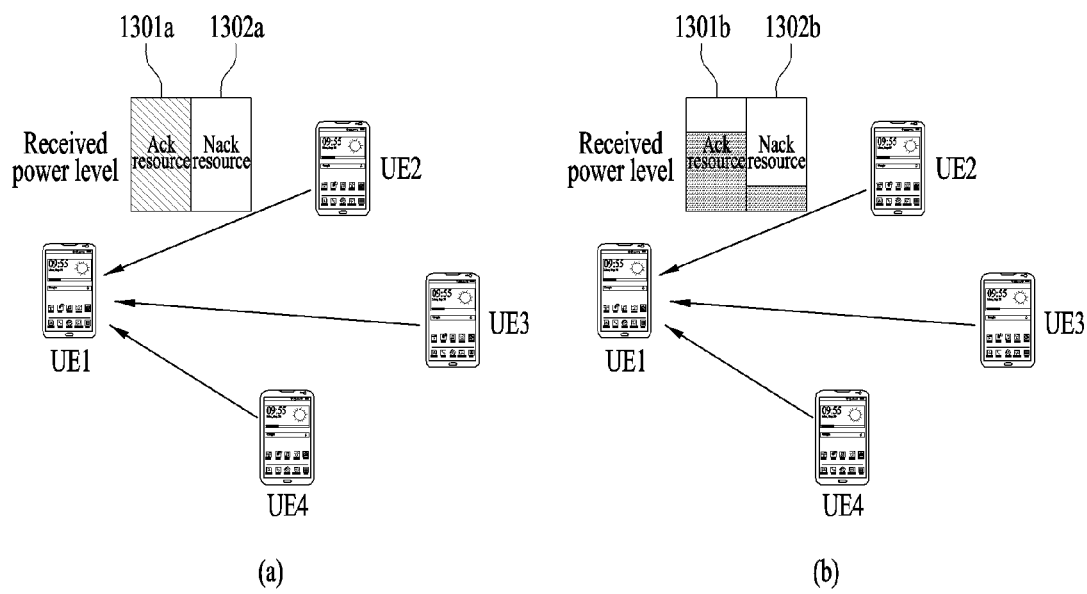
FIG. 13 to FIG. 14 respectively illustrate a transmission of a reception confirmation response according to an exemplary embodiment of the present invention.

FIG. 13 illustrates a detailed example of the exemplary embodiment 1-1. In FIG. 13, a case when the first device to fourth device (UE1~UE4) perform groupcast, and when the first device transmits data, is assumed. FIG. 13(a) illustrates a case when the data transmitted by the first device are all properly received by the second device to fourth device. In this case, the second device to fourth device may transmit an ACK from the resource region (1301a) that is configured for the ACK at the same time (or within a CP range). Herein, the resource region that is configured for the ACK may be pre-configured, or may be delivered via higher layer signaling, or may be indicated in the control information transmitted from the first device. When the second device to fourth device transmit the ACK from the resource region that is configured for the ACK at the same time, since the first device detects energy only from the resource region that is configured for the ACK (i.e., energy (of a predetermined value or higher) cannot be detected in the resource region (1302a) that is configured for the NACK), knowing that the previous transmission is successful, re-transmission may not be performed. Conversely, in FIG. 13(b), a case when the second device to fourth device did not properly receive the data transmitted from the first device, and when NACK is transmitted, is assumed. In this case, the first device may detect energy of a predetermined value or higher from the resource region (1302b) that is configured for the NACK and may, then, perform re-transmission. However, since the first device is incapable of knowing in which device the transmission has not been properly performed, re-transmission may be broadcasted/groupcasted.

Exemplary Embodiment 1-2

Among the D2D devices, only the devices having pathloss (or SINR) greater than a specific threshold value (in case the threshold value is configured for the SINR, only the device having SINR smaller than the specific threshold value) may be configured to transmit the ACK/NACK. Herein, the specific threshold value may be pre-configured, or may be delivered via higher layer signaling, or may be indicated in the control information transmitted from the first device. More specifically, during the measurement step, in case the pathloss of a specific device is outstandingly low, since the likelihood of properly detecting the data being transmitted for the group is high, by preventing the reception confirmation responses from being transmitted to such devices, the number of resources/channels required for the reception confirmation responses may be reduced. The device transmitting the reception confirmation response may be directly designated by the first device, which transmits groupcast data, or may be determined by the devices, which receive the groupcast data, on their own whether or not to transmit the reception confirmation response based upon the measurement result. The reception confirmation response may be transmitted through a resource region (position deduced from an ID of the D2D data reception device) being differentiated for each device. In order to do so, a number of ACK/NACK resources shall be determined in advance, and positions of the resources transmitting the ACK/NACK may be determined in advance for each UE. In the exemplary embodiments, N number of ACK/NACK transmission resources are pre-configured in advance, and, among each of the UEs, devices having pathloss equal to or below a predetermined threshold may transmit ACK/NACK to an ACK/NACK transmission resource position corresponding to a value, which is calculated by obtaining modular N from a UE ID. Alternatively, the transmission may also be performed from the resource region of Exemplary embodiment 1-1. More specifically, devices having pathloss greater than the threshold value (or devices having SINR smaller than the specific threshold value) may be differentiated from one another in accordance with the ACK/NACK, and ACK/NACK may be transmitted through a resource region that is common to the group. Accordingly, the resource region to which the reception confirmation response is being transmitted may only use devices having pathloss greater than the predetermined value.

Exemplary Embodiment 1-3

Device(s) receiving D2D groupcast signal(s) may transmit a reception confirmation response to a specific resource region by using a CDM (Code Division Multiplex) method. However, based upon the characteristics of CDM, in this case, the reception confirmation responses being transmitted from the devices that are located in remote positions (far devices) may not be properly received due to a near-far problem. Accordingly, in order to assign highest priority levels to devices located in the most remote positions from the device transmitting the groupcast signal, the transmission power for transmitting the reception confirmation responses may be configured to be proportional to the pathloss. Exemplary embodiment 1-3 may also be applied along with other exemplary embodiments. For example, although the device may transmit ACK/NACK from a resource region for the reception confirmation response of Exemplary embodiment 1-1, the transmission power may be proportional to the pathloss. This may be similar to the configuration of the PUCCH transmission power in the legacy LTE/LTE-A system, wherein the PUCCH transmission power configured to be proportional to pathloss between the eNB and the UE, and, accordingly, the transmission power of the groupcast ACK/NACK may be configured to be proportional to the pathloss between the D2D groupcast transmission UE and the D2D groupcast reception UE. Herein, the important point is that the pathloss is between the transmission UE and the reception UE and not between the eNB and the UE. In order to do so, each reception UE may measure the pathloss from the transmission UE by performing discovery or by using another pre-configured reference signal (e.g., a synchronization signal or a UE-DMRS, or a measurement RS that is separately configured).

Exemplary Embodiment 1-4

Figure 14:
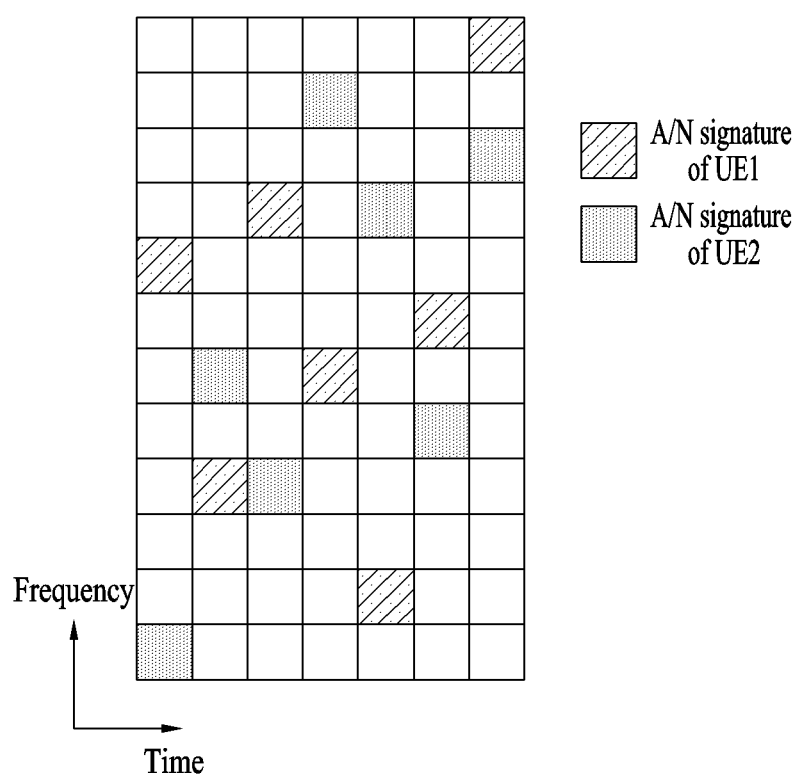

The reception confirmation response may be transmitted in a single tone from a specific resource region. For example, as shown in the example of FIG. 14, one device may transmit only a single tone from one OFDM symbol. As described above, by transmitting a single tone, the near-far problem may be alleviated, and less influence caused by the difference in the reception power may occur as compared to the CDM method.

Exemplary Embodiment 1-5

Subsequently, the reception confirmation (or acknowledgement) response (or ACK/NACK) may be configured to be transmitted with respect to each device group. More specifically, the devices are grouped, and devices belonging to the same group may transmit the ACK/NACK from the same resource region. Herein, the group may be determined based upon pathloss, SINR, and so on. For example, pathloss may bind similar devices to the same group. Devices belonging to the same group may transmit one of ACK and NACK, from one of an ACK resource and a NACK resource, which is assigned in accordance with the group, at the same time point as the other devices belonging to the same group. In case a NACK is generated, the device that has transmitted D2D data may perform re-transmission with respect to the corresponding group, and, at this point, the re-transmission may be performed through a dedicated resource, which is dedicated to the corresponding group. Furthermore, the re-transmission may be transmitted by a transmission power that is adequate to the corresponding group.

Exemplary Embodiment 1-6

As yet another method for reducing the number of ACK/NACK feedback channels, bundling of a maximum time dimension may be performed when performing ACK/NACK feedback. For example, transmission data respective to N number of subframes may always be transmitted by a one-time time bundling. Herein, an ACK/NACK bundling window size (number of SFs participating (or associating) the A/N in time bundling) N may be semi-statically configured to the device and may be signaled as a physical layer signal or a higher layer signal by the network or by the groupcast transmission UE, or may be determined in advance as a specific value.

Exemplary Embodiment 2

In an aspect slightly different from the exemplary embodiments that are described above, a TTI bundling method, a dispersion method, such as repetition coding or PUCCH format 3 transmission, may be used. More specifically, in Exemplary embodiment 2, this is significant as a method for reducing the NACK generation itself. As yet another method, alternatively, automatic re-transmission may also be applied to the groupcast. For example, transmission may be repeatedly performed in a subframe of an immediately concatenated position, as in TTI bundling, or re-transmission may also be performed without any ACK/NACK in accordance with a HARQ retransmission cycle period (8 ms in case of FDD). Alternatively, automatic re-transmission may also be performed in a pre-determined subframe or a subframe, which is indicated by the groupcast transmission UE by using the physical layer or higher layer signal. A number of automatic re-transmissions and/or a re-transmission cycle period may be configured based upon a channel measurement when performing groupcast initialization (when performing discovery and establishing link set-up) or may be pre-configured (or pre-determined). In this case, the ACK/NACK transmission of the physical layer is not performed, and the ACK/NACK of the higher layer may be performed.

The above-described diverse exemplary embodiments of the present invention may be used independently or may be used as a combination of two or more exemplary embodiments. Additionally, the above-described exemplary embodiments are not necessarily applicable only to D2D groupcast. For example, the exemplary embodiments may also be applied as a method for transmitting A/N respective to a dynamic UL-DL reconfiguration method in eIMTA (enhanced interference management and traffic adaptation).

Figure 15:
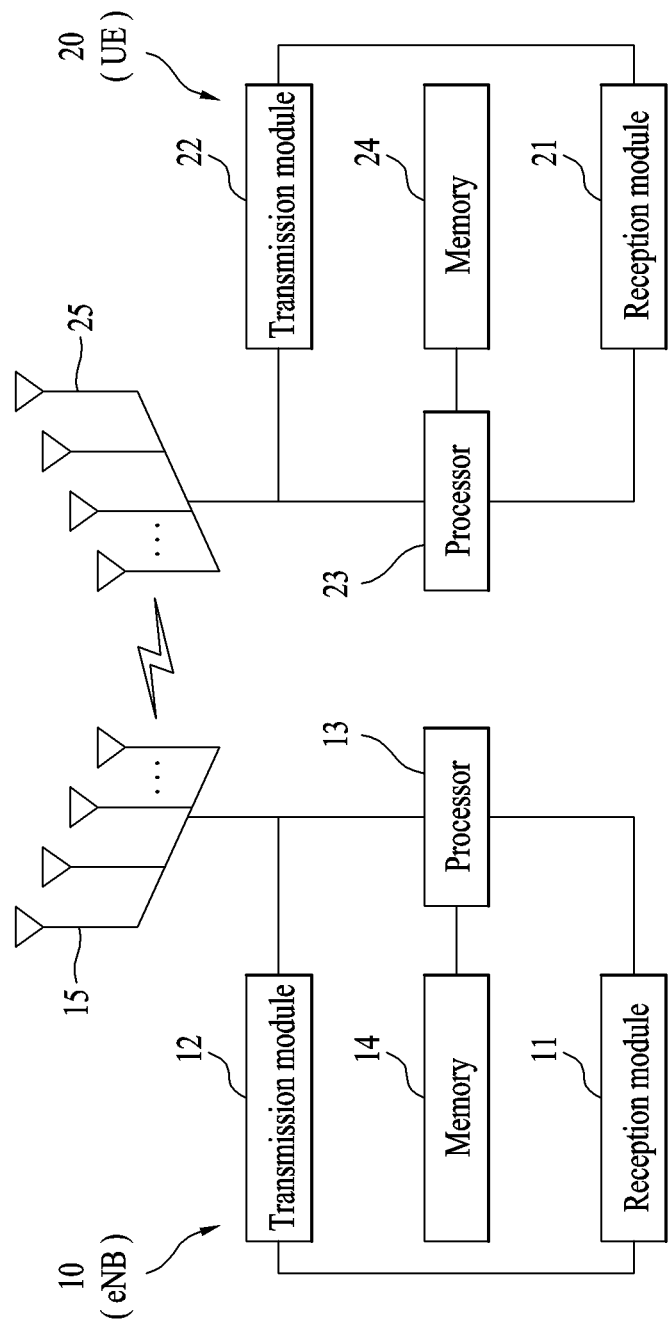
FIG. 15 illustrates a configuration of a transceiving device.

Device Configuration According to the Exemplary Embodiment of the Present Invention FIG. 15 illustrates configurations of a transmission point device and a user equipment device according to an exemplary embodiment of the present invention.

Referring to FIG. 15, the transmission point device (10) according to the present invention may include a reception module (11), a transmission module (12), a processor (13), a memory (14), and multiple antennae (15). The multiple antennae (15) indicate that the transmission point device supports MIMO transmission/reception (or transception). The reception module (11) may receive diverse signals, data, and information within an uplink from the user equipment. The transmission module (12) may transmit diverse signals, data, and information within a downlink to the user equipment. The processor (13) may control the overall operations of the transmission point device (10).

The processor (13) of the transmission point device (10) according to an exemplary embodiment of the present invention may process the details that are required in each of the exemplary embodiments, which are described above.

Moreover, in addition to the above-described functions, the processor (13) of the transmission point device (10) may perform functions of performing calculation operations of information received by the transmission point device (10), information that is to be transmitted to an external target, and so on. And, the memory (14) may store the calculated information for a predetermined period of time, and the memory (14) may also be replaced with another element, such as a buffer (not shown).

Additionally, referring to FIG. 15, the user equipment device (20) according to the present invention may include a reception module (21), a transmission module (22), a processor (23), a memory (24), and multiple antennae (25). The multiple antennae (25) indicate that the user equipment device supports MIMO transmission/reception (or transception). The reception module (21) may receive diverse signals, data, and information within a downlink from the base station. The transmission module (22) may transmit diverse signals, data, and information within an uplink to the base station. The processor (23) may control the overall operations of the user equipment device (20).

The processor (23) of the user equipment device (20) according to an exemplary embodiment of the present invention may process the details that are required in each of the exemplary embodiments, which are described above.

In addition to the above-described functions, the processor (23) of the user equipment device (20) may perform functions of performing calculation operations of information received by the user equipment device (20), information that is to be transmitted to an external target, and so on. And, the memory (24) may store the calculated information for a predetermined period of time, and the memory (24) may also be replaced with another element, such as a buffer (not shown).

The detailed structure of the transmission point device and the user equipment device, as described above, may be implemented by independently applying the detailed described in diverse exemplary embodiments of the present invention or may be implemented by simultaneously applying 2 or more exemplary embodiments of the present invention. And, for clarity in the description, overlapping contents will be omitted.

Additionally, in the description on FIG. 15, the description on the transmission point device (10) may also be equally applied to a relay device operating as a downlink transmitting subject or an uplink receiving subject, and the description on the user equipment device (20) may also be equally applied to a relay device operating as a downlink receiving subject or an uplink transmitting subject.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

The detailed description of the preferred embodiments of the present invention disclosed herein as described above is provided so that those skilled in the art can easily implement and realize the present invention. Although the embodiment of the present invention has been described with reference to the accompanying drawings, the described embodiment of the present invention is merely exemplary. Therefore, it will be apparent to those skilled in the art that various modifications and variations can be made in the present invention without departing from the spirit or scope of the inventions. For example, anyone skilled in the art may combine each component disclosed in the description of the embodiments of the present invention. Therefore, it is intended that the present invention covers the modifications and variations of this invention provided they come within the scope of the appended claims and their equivalents, and it is not intended to limit the present invention only to the examples presented herein.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described exemplary embodiments according to the present invention may be applied to diverse mobile communication systems.

What is claimed is:

1. As a method for transmitting and receiving signals between devices in a wireless communication system, the signal transmission and reception method comprises the steps of:

receiving, by a first device, a signal from other devices; and transmitting, by the first device, a reception confirmation in response to the signal, wherein a resource region in which the reception confirmation is transmitted is differentiated according to whether the reception confirmation is ACKnowledgement (ACK) or Negative ACKnowledgement (NACK), wherein the resource region in which the reception confirmation is transmitted is commonly used for devices which have received the signal, and wherein the resource region is allocated only to devices having a pathloss of the signal greater than a predetermined value.

2. The method of claim 1, wherein, among the resource regions in which a reception confirmation is transmitted, when energy equal to or greater than a predetermined value is detected in a resource region corresponding to the Negative ACKnowledgement (NACK), the signal transmission and reception method further comprises the step of:

receiving a re-transmission related to the signal.

3. The method of claim 2, wherein the re-transmission related to the signal is broadcasted by the first device.

4. The method of claim 1, wherein the signal is multi-casted to the other devices.

5. The method of claim 1, wherein the transmission power the first device uses to transmit the reception confirmation is proportional to a pathloss between the first device and each of the other devices.

6. A D2D device for transmitting and receiving signals between devices in a wireless communication system, the device comprising:
- a radio frequency (RF) unit; and
- a processor that:
- controls the RF unit to receive a signal from other devices, and
- controls the RF unit to transmit a reception confirmation in response to the signal,
- wherein a resource region in which the reception confirmation is transmitted is differentiated according to whether the reception confirmation is ACKnowledgement (ACK) or Negative ACKnowledgement (NACK),
- wherein the resource region in which the reception confirmation is transmitted is commonly used for devices which have received the signal, and
- wherein the resource region is allocated only to devices having a pathloss of the signal greater than a predetermined value.

* * * * *